United States Patent Office 2,905,597
Patented Sept. 22, 1959

2,905,597
PURIFICATION OF AMMONIA

Joseph D. Stafford, Jr., and Carl E. Alleman, Dumas Tex., assignors to Phillips Petroleum Company, a corporation of Delaware No Drawing. Application January 16, 1956
Serial No. 559,130

10 Claims. (Cl. 202—40)

This invention relates to a method of purifying ammonia which has become contaminated with water and various mineral salts. In another aspect, it relates to a method of recovering ammonia from underground storage caverns in a substantially pure form. In one of its more specific aspects, this invention relates to a method of recovering substantially pure, anhydrous ammonia from storage in underground caverns that have been prepared by dissolving salt formations.

Ammonia, like liquefied petroleum gases, is a product that is subject to seasonal use; and to realize the economic advantages of level production, large storage facilities must be provided. It has been a practice for some time to store liquefied petroleum gas products in underground storage caverns made by drilling to a salt formation and dissolving out a portion of the salt to form the cavity. The advantages of such a system are well known; and recently, steps have been taken to employ these advantages for the storage of liquid ammonia. In such an application, the reservoir is formed in the usual manner, by pumping water into a salt formation and removing the brine. The ammonia is introduced into the resulting cavern and stored therein under pressure.

Although from an economic standpoint, utilization of underground storage caverns, as described, for the storage of ammonia is much to be desired, a serious problem is encountered in recovering the ammonia from the underground cavern. Inevitably, some water used in washing out the salt formation is left in the cavern, and salt and other minerals are dissolved in this water in high concentrations. The ammonia stored in the cavern becomes contaminated with excessive quantities of said water and minerals which greatly complicate the purification process necessary to recover this ammonia from the cavern in a usable form. Of the minerals which contaminate the ammonia, sodium chloride is predominate, but other soluble mineral salts also are present in lesser amounts. The identity of all the contaminants is not known, but it is relatively certain that there are present in the ammonia as it is extracted from the cavern, several mineral salts and clays which would be absent or negligible were it not for the water that is present in the cavern.

It is to be expected that ammonia stored in a salt cavern will dissolve small quantities of contaminating materials since anhydrous ammonia will dissolve approximately 4 percent by weight of sodium chloride at 55 to 60° F. It was not anticipated, however, that water used in forming the cavern would remain in the cavern and serve to increase the percentage of contaminants present in the ammonia stored therein.

Plans for recovering ammonia from underground storage included conventional purification means; for example, vaporizing processes such as distillation in a fractionating column, vaporization with heated coils, or by the injection of live steam, and the like. A preferred method of purifying ammonia is by distillation in a fractionating column; however, it was found in actual practice that this means is inoperative as a purification step in the recovery of ammonia from underground caverns when concentrations of impurities in said ammonia reach a certain magnitude. The exact reason for this is not known, but the difficulty encountered takes the form of severe upsets in the fractionating column which result in contamination of the overhead product. Several attempts to overcome this difficulty were unsuccessful until the discovery of this invention. These unsuccessful attempts are described in greater detail, and the magnitude of the problem is better illustrated in the examples of this specification.

It has been discovered that a satisfactory recovery of ammonia from underground storage caverns can be effected using a distillation process as the purification means for the ammonia from the cavern, by distilling said ammonia in the presence of small quantities of materials known generally as antifoam agents. By the term "antifoam agents" as used throughout this specification and in the claims, is meant compositions such as lecithin, liquid polydimethyl siloxanes, eugenol, isougenol, guaiacol, vanillin, vanillyl alcohol, hydroquinone monoethyl-ether, mixtures of C–16 and C–18 unsaturated alcohols, 2-hydroxy-3-methoxy benzaldehyde, 2-methoxy-4-methyl phenol, and the like. The polydimethyl siloxanes have the general formula

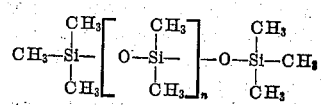

where n is a large integer resulting in a compound having a viscosity of at least 40 centistokes at 25° C. All of these compounds fall into the general classification of antifoam agents, and it is recognized that any agent thus identified would be operable for the practice of this invention. It was also discovered that the antifoam agent is used in the distillation process in amounts ranging from 1 to 200 parts per million, preferably from 50 to 150 parts per million by weight based on the ammonia feed from the cavern. In one embodiment of this invention, a fractionating column is used and the agent described is added either to the feed stream, the reflux stream, or introduced at the top of the column.

It is an object of this invention to provide a method for purifying ammonia which is contaminated with water and mineral salts.

It is another object of this invention to provide a process for recovering ammonia from underground storage caverns in substantially pure form.

It is still another object of this invention to provide a process for distilling ammonia contaminated with considerable quantities of water and mineral salts whereby substantially pure, anhydrous ammonia is obtained.

Various other objects, advantages, and features of this invention will become apparent from the following detailed description.

The storage of ammonia in underground caverns is a relatively new field, and very little work has been done in this area beyond that with which the examples of this invention are immediately concerned. It has been found that the first ammonia removed from a newly prepared cavern will contain considerable quantities of water, in some cases as high as 60 weight percent; and this water carries with it contaminating materials which complicate the purification problem. It has been observed that subsequent additions and extractions of ammonia from the same underground cavern yield cavern effluents which have considerably less water and other contaminating materials than the first ammonia so removed. It should, therefore, be pointed out that this invention is particularly valuable in recovering the first ammonia to be stored in a newly prepared underground cavern.

A method by which this invention can be employed to achieve the desired purification of such ammonia is exemplified as follows. For purposes of illustration, a single embodiment of this invention is described in detail; however, variations and ramifications of this example will be apparent to those skilled in the art and it is intended that these variations be included in the scope of this invention which is not to be limited by the examples.

EXAMPLES

Ammonia was removed from underground storage by pressurizing the cavern with inert gases. This ammonia, when analyzed, was found to be highly contaminated, the analysis reading as follows:

| | Weight percent |
|---|---|
| Ammonia | 22.6 |
| Water | 67.4 |
| Salts | 10.0 |

The salts present were predominantly sodium chloride, but other mineral salts and clays were present in small amounts. This contaminated ammonia will hereinafter be referred to as "cavern effluent" to distinguish it from substantially pure ammonia. This cavern effluent was pumped to a still feed tank and from there charged to a distillation column on a continuous basis. The distillation was performed in a packed fractionating column 30 inches in diameter and 30 feet long. The operation of the distillation process for the recovery of ammonia from the cavern effluent was similar to the processing of plant aqua with the exception of the application of this invention. By "plant aqua" is meant ammonium hydroxide produced by an ammonia synthesis plant.

The fractionating column was started using plant aqua feed at 16 gallons per minute until a steady state had been reached. The cavern effluent was started to the still at a rate of 4 gallons per minute and the plant aqua feed rate was reduced to 12 gallons per minute. The operating conditions are shown by Table I.

Table I

| | |
|---|---|
| Cavern effluent feed rate | 4 gallons per minute. |
| Plant aqua feed rate | 12 gallons per minute. |
| Reflux | 16 gallons per minute. |
| Tower pressure | 175 pounds per square inch gauge. |
| Kettle temperature | 370° F. |
| Condenser pressure | 170 pounds per square inch gauge. |

Analysis of overhead product:

| | |
|---|---|
| Ammonia | 87 weight percent. |
| Water | 12 weight percent. |
| Chlorides | 200+ parts per million. |

After 25 minutes, the column flooded (liquid was held up in the column) and the operation was halted. Repeated attempts were made to line out the operation without success. Some of the approaches to the problem were as follows:

(a) Reduce kettle temperature and then increase steam rate gradually;

(b) Drain the system completely and wash with condensate. This was done to clean the system of suspended solids and other contaminating material that may have been in the initial charge;

(c) Increase plant aqua feed rate to 16 gallons per minute and reduce cavern effluent feed rate to 1.5 gallons per minute;

(d) Operate at a kettle temperature of 300° F. Each time the temperature reached 310° to 312° F. the column flooded, independently of the amount of feed or the ratio of cavern effluent to plant aqua in the feed.

After several unsuccessful attempts had been made to purify the cavern effluent, this invention was discovered and applied with remarkable results. The column was placed on stream at a steady state using plant aqua and then switched to cavern effluent feed. Lecithin, an antifoam agent, was injected into the cavern effluent feed line at the rate of 70 parts per million by weight based on the cavern effluent feed. The operating conditions are shown by Table II.

Table II

| | |
|---|---|
| Cavern effluent feed rate | 8 gallons per minute. |
| Plant aqua feed rate | 9 gallons per minute. |
| Reflux | 16 gallons per minute. |
| Tower pressure | 175 pounds per square inch gauge. |
| Kettle temperature | 330° F. |
| Condenser pressure | 160 pounds per square inch gauge. |
| Lecithin feed rate with reference to cavern effluent feed | 70 parts per million. |

Analysis of overhead product:

| | |
|---|---|
| Ammonia | 99.85 weight percent. |
| Water | 0.15 weight percent. |
| Chlorides | 0.4 part per million. |

This operation was the most successful achieved from the standpoint of product purity and smoothness of operation. The operating conditions and product analysis of the last run of the series are shown by Table III.

Table III

| | |
|---|---|
| Cavern effluent feed rate | 8 gallons per minute. |
| Plant aqua feed rate | 9 gallons per minute. |
| Reflux | 16 gallons per minute |
| Tower pressure | 175 pounds per square inch gauge. |
| Kettle temperature | 340° F. |
| Condenser pressure | 160 pounds per square inch gauge. |
| Lecithin feed rate with reference to cavern effluent feed | 126 parts per million. |

Analysis of overhead product:

| | |
|---|---|
| Ammonia | 99.3 weight percent. |
| Water | 0.7 weight percent. |
| Chlorides | 6.5 parts per million. |

As can be seen from the above data, Tables I through III, the addition of an antifoam agent to the distillation process greatly improves the purity of the ammonia recovered.

The exact nature of the difficulty described in the ammonia recovery is still not known. It is logical to assume that the problem was caused by foaming in the column because the solution lay in the use of an antifoam agent; this however, is not a certainty. One year later than the operations described above, following the addition of fresh ammonia to the storage cavern, an apparently similar problem was encountered. In this instance, the cavern effluent tested 82 weight percent ammonia; 7.3 weight percent water; and, 10.7 weight percent chlorides. During the distillation of this material, flooding occurred similar to that of the previous year; however, when an antifoam agent, lecithin, was added to the still, the flooding continued. After two attempts at using antifoam agents with resulting upsets, it was decided to operate without such an agent. This indicates, certainly, that the solution of the problem encountered during the recovery of the highly contaminated ammonia was not obvious. Many factors can cause a distillation column to flood. In the present case, adding an antifoam agent to the column apparently affected the surface tension of the material in the column so that flooding was prevented. Whether foaming is the difficulty, or some other phenomenon that is controlled by the addition of these agents, has not been conclusively established.

The manner of employing the antifoam agent is also of importance. In general, the antifoam agent must be present in all accumulations of liquid which contain noticeable concentrations of the contaminants representative of those picked up in underground storage. In evaporators, this addition is relatively simple since there is only one body of liquid to treat. In a plate type fractionating column, the agent must be present on all trays. In a packed type fractionating column, it might seem the agent would need to be present only on the surface of the liquid in the bottom of the column; however, it was found that much better operation was obtained when the agent was injected with the feed so that it was present in all the regions below the feed point. Even this latter was not completely satisfactory under conditions of mild upset or high rates when some of the impurities were present above the feed point. To be most satisfactory, the antifoam agent must be introduced at the top of the column. The agent may be introduced separately at the top, but better distribution is obtained by mixing it with the reflux stream. When introducing the antifoam agent at the top of the column, care must be taken not to use emulsifying or diluting agents which will contaminate the overhead vapors. In order to secure the maximum benefits, the antifoam agent must be introduced on an approximately continuous basis.

It was found that conventional purification means for recovery from underground storage of ammonia that has been contaminated in the caverns with water in excess of about 15 percent by weight of the total solution, are inoperable unless this invention is applied. Where smaller amounts of water are present, it was found that a satisfactory distillation-purification operation can be carried out without the addition of an antifoam agent. Therefore, it is concluded that the unusual conditions which existed during the removal of the first ammonia from an underground storage cavern prepared by water dissolution, required a novel approach to the purification of ammonia. The use of antifoam addition agents as an integral part of the overall recovery operation solves these problems which might otherwise prevent the utilization of economical underground storage as described.

We claim:

1. A process for purifying ammonia contaminated with over 15 weight percent water and a substantial amount of dissolved mineral salts comprising rectifying said ammonia in the presence of sufficient antifoam agent to inhibit the carry-over of contaminants with the overhead product, and recovering therefrom substantially pure ammonia.

2. A process for purifying ammonia contaminated with a substantial amount of dissolved mineral salts and over 15 weight percent of water based on the total solution comprising rectifying said ammonia in the presence of an antifoam agent, said antifoam agent being added to the process at a rate from 1 to 200 parts per million by weight based on the contaminated ammonia feed, and recovering therefrom ammonia containing less than 2.0 weight percent of water and less than 100 parts per million of chlorides.

3. A process for purifying ammonia which has been removed from an underground storage cavern wherein said ammonia has become contaminated with over 15 weight percent water based on the total solution and a substantial amount of dissolved mineral salts, predominantly sodium chloride, comprising rectifying said ammonia in the presence of sufficient antifoam agent to inhibit the carry-over of contaminants with the overhead product to produce substantially pure ammonia.

4. The process of claim 3 wherein the contaminated ammonia contains between 15 and 70 weight percent of water based on the total solution and the pure ammonia product contains less than 2.0 weight percent of water and less than 100 parts per million of chlorides.

5. The process of claim 4 wherein the antifoam agent is introduced into the rectification zone by adding said antifoam agent to the contaminated ammonia feed stream.

6. The process of claim 4 wherein the antifoam agent is introduced at the top of the rectification zone.

7. The process of claim 4 comprising refluxing a portion of the overhead product to the rectification zone and introducing said antifoam agent to the rectification zone by adding said antifoam agent to the reflux stream.

8. A process for purifying a solution of at least about 20 weight percent ammonia which has been removed from an underground storage cavern, said ammonia having become contaminated with over 15 weight percent water based on the total solution and a substantial amount of dissolved mineral salts, predominantly sodium chloride, present in the underground storage zone, comprising rectifying said contaminated ammonia in the presence of an antifoam agent, said antifoam agent being added to the process at a rate from 50 to 150 parts per million by weight based on the contaminated ammonia feed.

9. A process for purifying a solution of at least about 20 weight percent ammonia which has been removed from an underground storage cavern, said ammonia having become contaminated with water and a substantial amount of dissolved mineral salts, predominantly sodium chloride, present in the underground storage zone, the contamination with water exceeding 15 weight percent based on the total solution, comprising rectifying said contaminated ammonia in the presence of an agent selected from the group consisting of lecithin, liquid polydimethyl siloxanes, eugenol, isoeugenol, guaiacol, vanillin, vanillyl alcohol, hydroquinone monoethylether, 2-hydroxy-3-methoxy-benzaldehyde, 2-methoxy-4-methyl phenol, and mixtures of C–16 and C–18 unsaturated alcohols; in sufficient quantity to inhibit the carry-over of contaminants with the overhead product, to produce substantially pure, anhydrous ammonia.

10. A process according to claim 9 wherein said agent which inhibits the carry-over of contaminants with the overhead product is added to the rectification zone at a rate from 50 to 150 parts per million by weight based on the contaminated ammonia feed.

References Cited in the file of this patent

UNITED STATES PATENTS

| | | |
|---|---|---|
| 253,045 | Hennelbutte | Jan. 31, 1882 |
| 367,992 | McMahon | Aug. 9, 1887 |
| 2,702,793 | Smith | Feb. 22, 1955 |
| 2,713,775 | Cottle | July 26, 1955 |
| 2,727,009 | Jursick | Dec. 13, 1955 |
| 2,732,334 | Pollock | Jan. 24, 1956 |
| 2,748,180 | Webber | May 29, 1956 |

OTHER REFERENCES

Ross: Chemical Antifoaming Agents, Chemical Industries, May 1949 (pages 757–759, especially 759 relied upon).

Holding Down the Foam, Chemical Week, June 27, 1953 (pages 65, 66, 68, especially 68 relied upon).